United States Patent
Ricketts

(10) Patent No.: US 10,602,666 B2
(45) Date of Patent: Mar. 31, 2020

(54) DRIVE UNIT FOR A DOWN CROP ATTACHMENT ON A HEADER

(71) Applicant: CNH Industrial America LLC, New Holland, PA (US)

(72) Inventor: Jonathan E. Ricketts, Coal Valley, IL (US)

(*) Notice: Subject to any disclaimer, the term of this patent is extended or adjusted under 35 U.S.C. 154(b) by 213 days.

(21) Appl. No.: 15/901,289

(22) Filed: Feb. 21, 2018

(65) Prior Publication Data

US 2019/0254231 A1 Aug. 22, 2019

(51) Int. Cl.
*A01D 45/02* (2006.01)
*A01D 57/06* (2006.01)
*A01D 61/00* (2006.01)

(52) U.S. Cl.
CPC .......... *A01D 57/06* (2013.01); *A01D 45/021* (2013.01); *A01D 45/023* (2013.01); *A01D 61/004* (2013.01)

(58) Field of Classification Search
CPC ...... A01D 57/06; A01D 45/02; A01D 45/021; A01D 45/023; A01D 43/082; A01D 43/083; A01D 61/004
USPC ......... 56/13.5, 14.3–14.5, 13.7, 98–106, 119
See application file for complete search history.

(56) References Cited

U.S. PATENT DOCUMENTS

| | | | |
|---|---|---|---|
| 1,734,972 A | 11/1929 | Johnson |
| 1,777,112 A | 9/1930 | Baker |
| 1,964,579 A | 6/1934 | Hyman |
| 3,803,820 A | 4/1974 | Knapp |
| 4,048,792 A | 9/1977 | Shriver et al. |
| 5,878,560 A | 3/1999 | Johnson |
| 2017/0172064 A1 | 6/2017 | VanNahmen |

FOREIGN PATENT DOCUMENTS

| | | |
|---|---|---|
| DE | 1482136 A1 | 7/1969 |
| EP | 3132667 A1 | 2/2017 |
| EP | 3245859 A1 | 11/2017 |

OTHER PUBLICATIONS

Extended European Search Report for EP Application No. 19158175.0 dated Jul. 10, 2019 (four pages).

*Primary Examiner* — Robert E Pezzuto
(74) *Attorney, Agent, or Firm* — Peter K. Zacharias; Patrick M. Sheldrake

(57) ABSTRACT

An agricultural vehicle including a chassis and a header connected to the chassis. The header includes a frame and a plurality of row units connected to the frame. Each row unit includes at least one gathering chain having a plurality of protuberances affixed thereto and a rotational path, and at least one hood connected to the frame. The header also includes a down crop gatherer mounted to the at least one hood and having a rotational path, and a drive unit mounted to the at least one hood, operably connected in between the at least one gathering chain and the down crop gatherer. The drive unit is configured for translating a respective movement of each protuberance as the plurality of protuberances rotate with the at least one gathering chain to drive the down crop gatherer.

20 Claims, 3 Drawing Sheets

DRIVE UNIT FOR A DOWN CROP ATTACHMENT ON A HEADER

FIELD OF THE INVENTION

The present invention pertains to headers with down crop attachments and, more specifically, to a drive unit for driving a down crop attachment on a header.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. The threshing rotor is provided with rasp bars that interact with the crop matter in order to further separate the grain from the crop matter, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A corn header generally includes a conveyor, row units, and accompanying drive architecture to power the header. The conveyor is disposed aft of the row units and it may be in the form of a conveyor belt, an auger with a tubular shaft having left and right flighting, or a combination of both. The row units generally include snouts, gathering chains, and stalk rolls. The snouts are conically shaped to pass in between the rows of corn, defining a designated passageway in between the snouts for the rows of corn to travel therein. Each row unit also includes respective gear boxes to drive the gathering chains and stalk rolls. Generally, the respective gear boxes are all driven by a single rotating cross shaft, which in turn is operably driven by the power take off (PTO) of the agricultural vehicle. As the agricultural vehicle traverses the field, the corn stalks are pulled inwardly by the gathering chains and downwardly by the stalk rolls. This motion causes the ears of corn to contact the base of the header, and thereby the ears snap off their respective stalks. The gathering chains additionally help to move crop material inwardly towards the conveyor, which transports the ears of corn to the center of the header for entry into the feeder house. The stripped corn stalks are further pinched and crushed by the stalk rolls, in order to accelerate the decomposition process of the stalks. The header may also include chopping units that have reciprocating blades located beneath the stalk rolls to chop the stalks, leaves, and other debris (also known as material other than grain "MOG") to more easily incorporate the remaining residue in subsequent tillage practices.

Some corn headers may further include a down corn attachment located on each snout, e.g. hood, of the header in order to move fallen, downed, and/or lodged crop material from the snouts to the conveyor. A down corn attachment may include a rotating chain or belt located at the center of the snout to pull crop material toward the conveyor. Incorporating a down corn attachment can decrease economic loss, since the bent, fallen, and/or lodged crop material would not otherwise be gathered into the header. Additionally, the down corn attachment will increase efficiency as the operator does not need to stop the harvesting process to clean lodged crop material from the header as often. However, down corn attachments may be complex and cumbersome to maintain. Additionally, some down corn attachments can undesirably increase the overall weight of the header.

What is needed in the art is a cost effective and efficient drive unit for driving a down crop attachment.

SUMMARY OF THE INVENTION

In one exemplary embodiment formed in accordance with the present invention, there is provided a corn header with hoods that have down crop gatherers attached thereto. The down crop gatherers are driven by drive units that are operably interconnected between the down crop gatherer and a respective gathering chain of each row unit. Each drive unit is located under a respective hood and includes a shaft rotatably connected to hood, a first gear connected to the shaft and used for contacting the lugs of the gathering chain, and a second gear connected to the shaft that rotates the down crop gatherer.

In another exemplary embodiment formed in accordance with the present invention, there is provided an agricultural vehicle including a chassis and a header connected to the chassis. The header includes a frame and a plurality of row units connected to the frame. Each row unit includes at least one gathering chain having a plurality of protuberances affixed thereto and a rotational path, and at least one hood connected to the frame and at least partially covering the at least one gathering chain. The header also includes a down crop gatherer mounted to the at least one hood and having a rotational path, and a drive unit mounted to the at least one hood, operably connected in between the at least one gathering chain and the down crop gatherer, and configured for translating a respective movement of each protuberance as the plurality of protuberances rotate with the at least one gathering chain to drive the down crop gatherer.

In yet another exemplary embodiment formed in accordance with the present invention, there is provided a header for an agricultural vehicle. The header includes a frame and a plurality of row units connected to the frame. Each row unit includes at least one gathering chain having a plurality of protuberances affixed thereto and a rotational path, and at least one hood connected to the frame and at least partially covering the at least one gathering chain. The header also includes a down crop gatherer mounted to the at least one hood and having a rotational path, and a drive unit mounted to the at least one hood, operably connected in between the at least one gathering chain and the down crop gatherer, and configured for translating a respective movement of each protuberance as the plurality of protuberances rotate with the at least one gathering chain to drive the down crop gatherer.

In yet another exemplary embodiment formed in accordance with the present invention, there is provided a method for operating an agricultural vehicle. The method includes the step of providing a header. The header includes a frame configured for connecting to the agricultural vehicle and a plurality of row units connected to the frame. Each row unit includes at least one gathering chain having a plurality of protuberances affixed thereto and a rotational path. The rotational path of the at least one gathering chain has a first section and a second section. Each row unit also includes at least one hood connected to the frame and at least partially covering the at least one gathering chain. The header also includes a down crop gatherer mounted to the at least one hood and having a rotational path, and a drive unit mounted to the at least one hood, operably connected in between the at least one gathering chain and the down crop gatherer, and configured for translating a respective movement of each protuberance as the plurality of protuberances rotate with the at least one gathering chain to drive the down crop gatherer. The drive unit includes a shaft rotatably coupled to the at least one hood, a first gear attached to the shaft, and a second gear attached to the shaft and operably coupled to the down crop gatherer. The method also includes the steps of gathering a standing crop material by the plurality of protuberances in the first section of the rotational path of the at least one gathering chain, driving the first gear of the drive unit by rotating the at least one gathering chain such that a respective protuberance contacts and rotates the first gear as the respective protuberance travels in the second section of the rotational path of the at least one gathering chain, driving the second gear by rotating the first gear which in turn rotates the shaft, driving the down crop gatherer by rotating the second gear, and gathering a down crop material from the at least one hood toward a rear of the header by the down crop gatherer.

One possible advantage of the exemplary embodiment of the header is that the down crop gatherer can be efficiently driven without significantly increasing the overall weight of the header.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
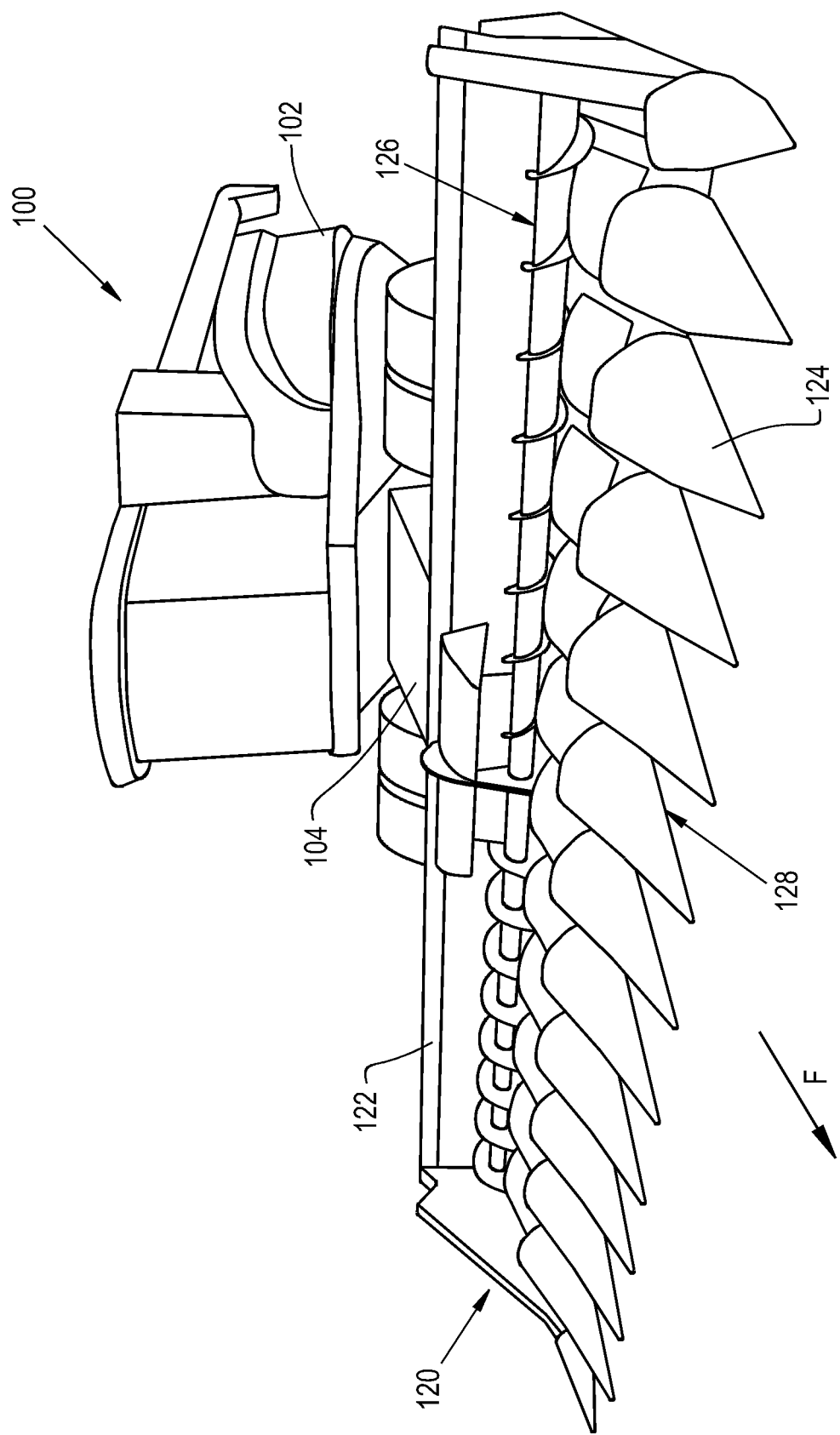
FIG. 1 illustrates a perspective view of a known agricultural vehicle with a conventional corn header.

Referring now to the drawings, and more particularly to FIG. 1, there is shown a conventional agricultural vehicle 100 in the form of a combine harvester 100 which generally includes a chassis 102, a feeder house 104, and a corn header 120 carried by the chassis 102. The corn header 120 includes a frame 122, snouts 124, a conveyor 126, e.g. an auger 126, and row units 128. The snouts 124 in part define a crop receiving slot or gap therebetween. Each row unit 128 may include one snout 124, a pair of gathering chains, and/or a pair of stalk rolls. The gathering chains and stalk rolls may be driven by respective gearboxes coupled to a single rotating cross shaft which is operably coupled to the PTO of the agricultural vehicle 100. The corn header 120 may also include choppers located underneath the stalk rolls of each row unit 128 that are driven by an additional rotating cross shaft which is operably coupled to the PTO of the agricultural vehicle 100. As the agricultural vehicle 100 traverses a field in a forward direction, denoted by arrow "F", the standing corn stalks are cut from the field and the ears of corn are stripped from the stalks by the motion of the gathering chains and stalk rolls. The ears of corn are then gathered by the conveyor 126 and are transported to the center of the header 120 for entry into the feeder house 104 and subsequent downstream processing through the agricultural vehicle 100. The stalks and the remaining MOG are pulled down by the stalk rolls and may be chopped into smaller pieces by the chopper.

Figure 2:
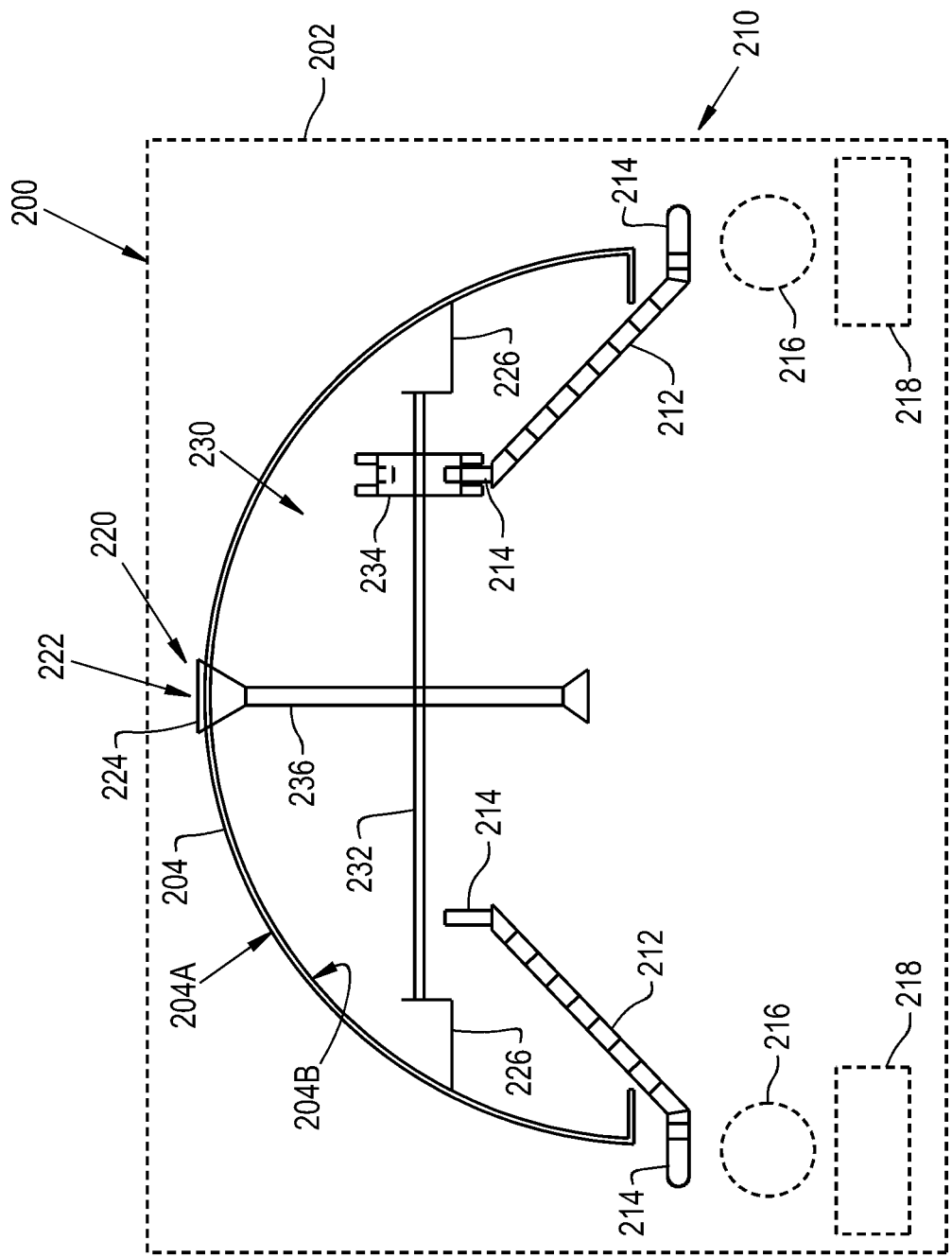
FIG. 2 illustrates a front view of a header including a down crop gathering system that has a down crop gatherer and a drive unit in accordance with an exemplary embodiment of the present invention.
Figure 3:
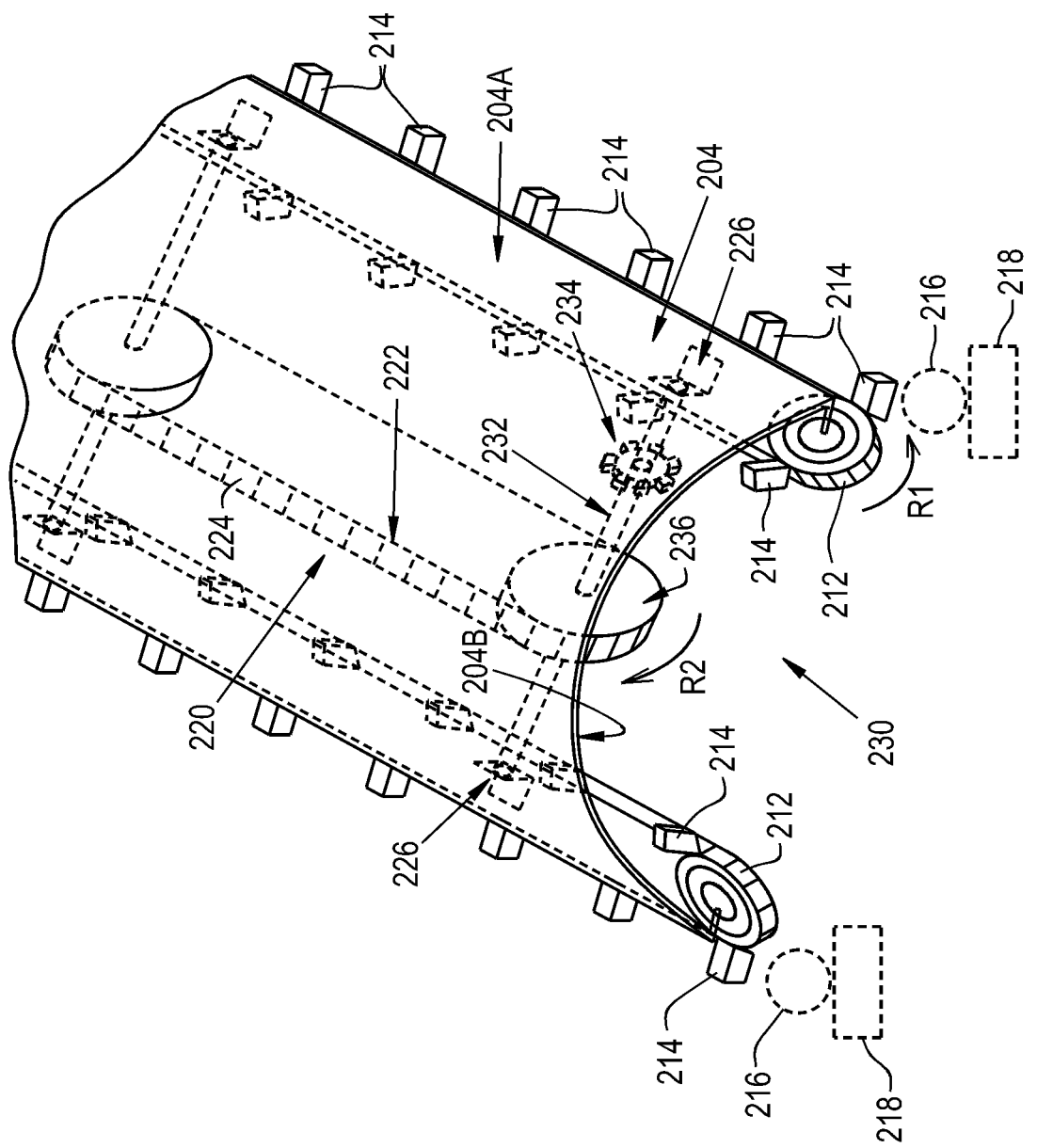
FIG. 3 illustrates a perspective view of the down crop gatherer and the drive unit of the header of FIG. 2, in accordance with an exemplary embodiment of the present invention.

Referring now to FIGS. 2-3, there is shown a corn header 200 according to an exemplary embodiment of the present invention. The corn header 200 may be attached to a combine 100 as discussed above. The corn header 200 generally includes a frame 202, one or more cross auger(s), and hoods 204 which define crop receiving gaps therebetween. The corn header 200 may also include row units 210 and a down crop gathering system with a down corn attachment 220 attached to each hood 204 and a drive unit 230 for driving the down corn attachment 220.

Each row unit 210 generally includes one hood 204, a pair of gathering chains 212 with protuberances 214, a pair of stalk rolls 216, and/or a pair of choppers 218 which are each at least partially covered by a respective hood 204. The gathering chains 212, stalk rolls 216, and the choppers 218 may each be driven by gearboxes that are operably connected to the agricultural vehicle 100 in a known manner.

The hoods 204, e.g. snouts, are coupled to and supported by the frame 202 of the header 200. The hoods 204 may have a conical shape and a substantially semi-circular cross-section. The hoods 204 define an outer surface 204A and an inner surface 204B. Each hood 204 may have one or more cutout(s), e.g. a center cutout, which extend(s) along the length of the hood for accommodating various crop gathering or shaking features as discussed below. Each hood 204 defines an interior space such that the hoods 204 cover the drive unit 230, which is located within the interior space of the hood 204. The hoods 204 may be composed of any suitable material including metal or plastic.

The gathering chains 212 may be in the form of metal chains or belts. The protuberances 214 may be in the form of fingers, such as lugs 214, which are configured to contact the crop material. The gathering chains 212 rotate in an elliptical rotational path R1 with a rotational direction, e.g. clockwise or counter-clockwise. The rotational path R1 can include a first, crop contacting section and a second, return section. In the first section, the lugs 214 move the crop material, e.g. the standing stalks of corn, toward the auger of the header 200. In the second section, the lugs 214 travel underneath the hoods 204 and return to the position in which the lugs 214 contact the crop material again. As shown, the gathering chains 212 may be mounted at an angle with respect to the horizontal plane of the header 200. The lugs 214 may be mounted at an angle with respect to the gathering chain 212 such that the lugs 214 are substantially horizontal in the first section of the rotational path R1 and substantially vertical in the second section of the rotational path R1. However, it should be appreciated that the gathering chains 212 may not be mounted at an angle relative to the header 200, and the lugs 214 may not be mounted at an angle relative to a respective gathering chain 212. It is conceivable that each row unit 210 may include one, two, or more gatherings chains 212 to convey the crop material inwardly toward the rear of the header 200.

The down crop attachment 220 may include one or more down crop gatherer(s) 222, which are moveably mounted to a respective hood 204. Each down crop gatherer 222 has a rotational path R2. The down crop gatherer 222 may include a chain or belt 224 positioned in a correlative cutout in the hood 204 in order to contact and move a down crop material, for example a bent, fallen, or lodged crop material, towards the rear of the header 200. The chain or belt 224 of the down crop gatherer 222 may include a textured surface and/or protrusions in the form of fingers to help facilitate the movement of the crop material (not shown). The crop gathering system may also include a pair of mounting brackets 226 for rotatably mounting the drive unit 230 to a respective hood 204.

The drive unit 230 generally includes a shaft 232 rotatably coupled to the hood 204, a first gear 234 attached to the shaft 232, and a second gear 236 attached to the shaft 232 and operably coupled to the down crop gatherer 222. The drive unit 230 is configured for translating a respective movement of the lugs 214 of the gathering chains 212 to drive the down crop gatherer 222. In other words, the drive unit 230 is operably connected in between the gathering chain 212 and the down crop gatherer 222 for translating the rotational movement of the gathering chain 212 into an opposite rational movement of the down crop gatherer 222. The shaft 232 can be rotatably coupled to the interior surface 204B of a respective hood 204 via the mounting brackets 226. The first gear 234 may be in the form of a sprocket 234 which is configured for contacting the lugs 214 of the gathering chain 212, and the second, driven gear 236 may be in the form of a wheel 236 which is configured for driving the down crop gatherer 222. It should be appreciated that the drive unit 230 may include an additional, correlative shaft and wheel, which are positioned rearwardly of the second, driven gear 236, in order to complete the rotational path of the down crop gatherer 222.

In operation, as the lugs 214 travel in the return section, underneath the hood 204, each lug 214 will respectively contact and rotate the driving gear 234. For example, the lugs 214 may travel in a counter-clockwise rotational direction R1, which will cause the driving gear 234 to rotate in a clockwise rotational direction R2. In turn, the rotation of the driving gear 234 rotates the shaft 232 which then rotates the driven gear 236, and thereby the chain or belt 224 may also rotate in the clockwise rotational direction R2. Hence, the down crop gatherer 222 will move fallen or lodged crop material from the hood 204 towards the rear of the header 200 onto the auger for further downstream processing. Thereby, the drive unit 230 drives the down crop gatherers 222 by way of the gathering chains 212, and hence the down crop attachment 220 does not require a separate driving system which could be cumbersome and significantly increase the weight of the header 200.

In the case where each row unit 210 includes a pair of gathering chains 212, one gathering chain 212 may be located at the right side of the hood 204, for contacting the driving gear 234 in the return section, and the other gathering chain 212 may be located at the left of the hood 204, which thereby would pass under the shaft 232 without making contact with the drive unit 230. It should be appreciated that the drive unit 230 may include multiple driven gears for driving multiple down crop gatherers 222. For instance, the drive unit 230 may include two or more driven gears which rotate two or more down crop gatherers 222 which are positioned in respective cutouts of the hood 204 (not shown).

In an alternative embodiment, the header 200 may include a shaker unit instead of a down crop gatherer 222. The shaker unit may include a shaker pan and a shaker arm operably coupled to the drive unit 230. Thereby, the drive unit 230 may then drive the shaker arm in order to oscillate the shaker pan.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
a chassis; and
a header connected to the chassis and including:
    a frame;
    a plurality of row units connected to the frame, each said row unit including:
        at least one gathering chain having a plurality of protuberances affixed thereto and a rotational path; and
        at least one hood connected to the frame and at least partially covering said at least one gathering chain;
    a down crop gatherer mounted to said at least one hood and having a rotational path; and
    a drive unit mounted to said at least one hood, operably connected in between said at least one gathering chain and said down crop gatherer, and configured for translating a respective movement of each said protuberance as said plurality of protuberances rotate with said at least one gathering chain to drive said down crop gatherer.

2. The agricultural vehicle of claim 1, wherein said drive unit includes a shaft rotatably coupled to said at least one hood, a first gear attached to the shaft, and a second gear attached to the shaft and operably coupled to the down crop gatherer.

3. The agricultural vehicle of claim 2, wherein said first gear is configured for respectively contacting each said protuberance such that the respective movement of each said protuberance rotates the first gear which in turn rotates said second gear, and said second gear is configured for driving the down crop gatherer.

4. The agricultural vehicle of claim 3, wherein said rotational path of said at least one gathering chain has a first section and a second section such that said plurality of protuberances contact a crop material in the first section and said plurality of protuberances respectively contact and rotate said first gear in the second section.

5. The agricultural vehicle of claim 1, wherein said at least one gathering chain and said down crop gatherer rotate in opposite directions.

6. The agricultural vehicle of claim 1, wherein said down crop gatherer includes one of a chain and a belt that is configured for transporting a crop material from said at least one hood toward a rear of the header.

7. The agricultural vehicle of claim 2, wherein said at least one hood defines an interior space, and said at least one hood covers said drive unit which is located within the interior space of said at least one hood.

8. The agricultural vehicle of claim 1, wherein said at least one gathering chain is mounted at an angle relative to a horizontal plane of the header.

9. A header for an agricultural vehicle, comprising:
a frame;
a plurality of row units connected to the frame, each said row unit including:
at least one gathering chain having a plurality of protuberances affixed thereto and a rotational path; and
at least one hood connected to the frame and at least partially covering said at least one gathering chain;
a down crop gatherer mounted to said at least one hood and having a rotational path; and
a drive unit mounted to said at least one hood, operably connected in between said at least one gathering chain and said down crop gatherer, and configured for translating a respective movement of each said protuberance as said plurality of protuberances rotate with said at least one gathering chain to drive said down crop gatherer.

10. The header of claim 9, wherein said drive unit includes a shaft rotatably coupled to said at least one hood, a first gear attached to the shaft, and a second gear attached to the shaft and operably coupled to the down crop gatherer.

11. The header of claim 10, wherein said first gear is configured for respectively contacting each said protuberance such that the respective movement of each said protuberance rotates the first gear which in turn rotates said second gear, and said second gear is configured for driving the down crop gatherer.

12. The header of claim 11, wherein said rotational path of said at least one gathering chain has a first section and a second section such that said plurality of protuberances contact a crop material in the first section and said plurality of protuberances respectively contact and rotate said first gear in the second section.

13. The header of claim 9, wherein said at least one gathering chain and said down crop gatherer rotate in opposite directions.

14. The header of claim 9, wherein said down crop gatherer includes one of a chain and a belt that is configured for transporting a crop material from said at least one hood toward a rear of the header.

15. The header of claim 10, wherein said at least one hood defines an interior space, and said at least one hood covers said drive unit which is located within the interior space of said at least one hood.

16. The header of claim 9, wherein said at least one gathering chain is mounted at an angle relative to a horizontal plane of the header.

17. A method for operating an agricultural vehicle, comprising the steps of:
providing a header including a frame configured for connecting to the agricultural vehicle, a plurality of row units connected to the frame, each said row unit including at least one gathering chain having a plurality of protuberances affixed thereto and a rotational path, said rotational path of said at least one gathering chain has a first section and a second section, and at least one hood connected to the frame and at least partially covering said at least one gathering chain, a down crop gatherer mounted to said at least one hood and having a rotational path, and a drive unit mounted to said at least one hood, operably connected in between said at least one gathering chain and said down crop gatherer, and configured for translating a respective movement of each said protuberance as said plurality of protuberances rotate with said at least one gathering chain to drive said down crop gatherer, said drive unit including a shaft rotatably coupled to said at least one hood, a first gear attached to the shaft, and a second gear attached to the shaft and operably coupled to the down crop gatherer;
gathering a standing crop material by said plurality of protuberances in the first section of the rotational path of said at least one gathering chain;
driving the first gear of the drive unit by rotating said at least one gathering chain such that a respective protuberance contacts and rotates the first gear as the respective protuberance travels in the second section of the rotational path of said at least one gathering chain;
driving the second gear by rotating the first gear which in turn rotates the shaft;
driving the down crop gatherer by rotating the second gear; and
gathering a down crop material from said at least one hood toward a rear of the header by said down crop gatherer.

18. The method of claim 17, wherein said down crop gatherer includes one of a chain and a belt.

19. The method of claim 17, wherein said at least one hood defines an interior space, and said at least one hood covers said drive unit which is located within the interior space of said at least one hood.

20. The method of claim 17, wherein said at least one gathering chain is mounted at an angle relative to a horizontal plane of the header.

* * * * *